US012308539B2

(12) United States Patent
Suzuki et al.

(10) Patent No.: US 12,308,539 B2
(45) Date of Patent: May 20, 2025

(54) ASSEMBLY PARTS FOR CONNECTOR DEVICE AND CONNECTOR DEVICE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Satoshi Suzuki, Yokkaichi (JP); Shigeru Ogihara, Yokkaichi (JP); Shigeki Shimada, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 352 days.

(21) Appl. No.: 17/911,807

(22) PCT Filed: Mar. 26, 2021

(86) PCT No.: PCT/JP2021/013128
§ 371 (c)(1),
(2) Date: Sep. 15, 2022

(87) PCT Pub. No.: WO2021/200753
PCT Pub. Date: Oct. 7, 2021

(65) Prior Publication Data

US 2023/0131207 A1 Apr. 27, 2023

(30) Foreign Application Priority Data

Mar. 31, 2020 (JP) ................................ 2020-064595

(51) Int. Cl.
*H01R 12/58* (2011.01)
*H01R 13/04* (2006.01)

(52) U.S. Cl.
CPC .......... *H01R 12/585* (2013.01); *H01R 13/04* (2013.01)

(58) Field of Classification Search
CPC ... H01R 12/585; H01R 13/04; H01R 5813/04
(Continued)

(56) References Cited

U.S. PATENT DOCUMENTS 2,877,441 A * 3/1959 Narozny ............. H01R 13/052 439/82
2,950,458 A * 8/1960 Artz .................... H01R 12/718 439/82

(Continued)

FOREIGN PATENT DOCUMENTS

JP 2000-505590 A 5/2000
JP 2004-350445 A 12/2004

(Continued)

*Primary Examiner* — Harshad C Patel
(74) *Attorney, Agent, or Firm* — Oliff PLC

(57) ABSTRACT

Assembly parts for connector device including: substrate having through hole; press-fit terminal that is rod shape member to be press-fitted into through hole, wherein press-fit terminal includes leading end, press-fit, and base end portions, press-fit portion includes parallel portion with two parallel contact pieces separated by eye hole; and tapered portion connecting parallel and leading end portions together, in vertical cross section of press-fit terminal, eye hole with curved line constitutes leading end-side portion, lines constitute tapered portion include contact and reference points, contact points first come into contact with opening edge of through hole when press-fit terminal inserted into through hole, reference points are intersections of lines that constitute tapered portion and specific orthogonal lines, specific orthogonal lines are orthogonal lines passing
(Continued)

through end points of curved line, of lines orthogonal to lines that constitute tapered portion, contact points are located closer to leading end portion than reference points.

5 Claims, 5 Drawing Sheets

(58) Field of Classification Search
USPC ........................................... 439/733.1, 82
See application file for complete search history.

(56) References Cited

U.S. PATENT DOCUMENTS

| | | | | | |
|---|---|---|---|---|---|
| 2,972,727 | A * | 2/1961 | Flanagan, Jr. | H01R 12/718 | 439/444 |
| 3,846,741 | A * | 11/1974 | Kunkle | H01R 12/585 | 439/82 |
| 4,533,204 | A * | 8/1985 | Moynagh, Jr. | H01R 12/585 | 439/82 |
| 4,657,336 | A * | 4/1987 | Johnson | H01R 12/58 | 439/852 |
| 4,746,306 | A * | 5/1988 | Yurtin | H01R 13/641 | 439/352 |
| 4,790,764 | A * | 12/1988 | Kawaguchi | H01R 12/585 | 439/825 |
| 4,904,212 | A * | 2/1990 | Durbin | H01R 43/205 | 439/82 |
| 5,073,119 | A * | 12/1991 | Soes | H01R 12/585 | 439/82 |
| 5,139,446 | A * | 8/1992 | Costello | H01R 13/42 | 439/82 |
| 5,374,204 | A * | 12/1994 | Foley | H01R 13/114 | 439/82 |
| 5,452,512 | A * | 9/1995 | Foley | H01R 13/114 | 29/874 |
| 5,664,970 | A * | 9/1997 | Millhimes | H01R 12/585 | 439/873 |
| 5,916,000 | A * | 6/1999 | Feldmeier | H01R 12/585 | 439/751 |
| 5,951,306 | A * | 9/1999 | Millhimes | H01R 13/514 | 439/717 |
| 6,312,296 | B1 * | 11/2001 | Jones | H01R 13/41 | 439/943 |
| 6,619,999 | B2 * | 9/2003 | Bright | G02B 6/3897 | 439/943 |
| 6,652,293 | B2 * | 11/2003 | Fuchs | H01R 4/2406 | 439/694 |
| 6,722,928 | B1 * | 4/2004 | Noda | H01R 12/585 | 439/82 |
| 6,764,318 | B1 * | 7/2004 | Fajardo | H05K 3/308 | 439/82 |
| 6,809,537 | B2 * | 10/2004 | Adams | G01R 31/2808 | 439/74 |
| 6,875,032 | B2 * | 4/2005 | Tsuchiya | H01R 12/585 | 439/82 |
| 7,008,272 | B2 * | 3/2006 | Blossfeld | H01R 12/585 | 439/82 |
| 7,083,434 | B1 * | 8/2006 | Blossfeld | H01R 12/585 | 439/82 |
| 7,090,501 | B1 * | 8/2006 | Scherer | H01R 13/6585 | 361/65 |
| 7,249,981 | B2 * | 7/2007 | Chen | H01R 12/585 | 439/751 |
| 7,255,612 | B2 * | 8/2007 | Noguchi | H01R 12/585 | 439/82 |
| 7,273,398 | B2 * | 9/2007 | Taylor | H05K 3/326 | 439/620.2 |
| 7,491,897 | B2 * | 2/2009 | Watanabe | H05K 3/308 | 174/266 |
| 7,527,535 | B2 * | 5/2009 | Mueller | H01R 12/58 | 439/825 |
| 7,540,744 | B1 * | 6/2009 | Minich | H05K 1/18 | 439/65 |
| 7,618,283 | B1 * | 11/2009 | Costello | H01R 12/52 | 439/511 |
| 7,670,196 | B2 * | 3/2010 | Fedder | H01R 12/585 | 439/751 |
| 7,753,742 | B2 * | 7/2010 | Fedder | H01R 12/585 | 439/751 |
| 7,780,483 | B1 * | 8/2010 | Ravlich | H01R 12/585 | 439/82 |
| 7,789,716 | B2 * | 9/2010 | Fedder | H01R 13/6474 | 439/607.07 |
| 7,828,561 | B2 * | 11/2010 | Gueckel | H01R 12/7064 | 439/82 |
| 7,883,378 | B2 * | 2/2011 | Yamashita | H05K 1/119 | 439/75 |
| 7,946,861 | B2 * | 5/2011 | Sander | H01R 12/585 | 439/82 |
| 8,075,321 | B1 * | 12/2011 | Costello | H01R 12/585 | 439/77 |
| 8,118,611 | B2 * | 2/2012 | Jeon | H01R 31/08 | 439/511 |
| 8,371,871 | B1 * | 2/2013 | Murphy | H01R 12/585 | 439/444 |
| 8,545,237 | B2 * | 10/2013 | Johnson | H05K 3/368 | 439/75 |
| 8,992,235 | B2 * | 3/2015 | Kataoka | H01R 13/05 | 439/82 |
| 9,166,310 | B2 * | 10/2015 | Ludwig | H01R 12/585 | |
| 9,276,338 | B1 * | 3/2016 | Dariavach | H01R 12/585 | |
| 10,003,152 | B1 * | 6/2018 | Bianca | H01R 43/20 | |
| 10,153,568 | B2 * | 12/2018 | Goto | H01R 12/585 | |
| 10,476,191 | B2 * | 11/2019 | Venaleck | H01R 12/91 | |
| 10,547,128 | B1 * | 1/2020 | Lin | H01R 12/585 | |
| 10,644,423 | B2 * | 5/2020 | Watanabe | H05K 3/308 | |
| 10,680,360 | B2 * | 6/2020 | Yagyu | H05K 1/184 | |
| 10,855,009 | B2 * | 12/2020 | Choi | H01L 23/49555 | |
| 10,879,641 | B2 * | 12/2020 | Takeuchi | H01R 13/113 | |
| 10,916,869 | B2 * | 2/2021 | Tatsumi | H01R 12/585 | |
| 10,978,816 | B2 * | 4/2021 | Yoshida | H01R 12/58 | |
| 11,038,292 | B2 * | 6/2021 | Ludwig | H05K 3/325 | |
| 11,476,600 | B2 * | 10/2022 | Price | H01R 12/73 | |
| 11,616,330 | B2 * | 3/2023 | Herring | H01R 12/585 | 439/82 |
| 11,855,394 | B2 * | 12/2023 | Blakborn | H01R 13/6587 | |
| 2001/0046817 | A1 * | 11/2001 | Putnam | H01R 12/585 | 439/751 |
| 2006/0264076 | A1 * | 11/2006 | Chen | H01R 12/585 | 439/82 |
| 2007/0270001 | A1 * | 11/2007 | Matsumura | H05K 3/284 | 439/82 |
| 2007/0293100 | A1 * | 12/2007 | Jakob | H01R 12/585 | 81/488 |
| 2008/0032568 | A1 * | 2/2008 | Fedder | H01R 12/585 | 439/862 |
| 2008/0166928 | A1 * | 7/2008 | Tang | H05K 3/308 | 439/751 |
| 2008/0207015 | A1 * | 8/2008 | Sueyoshi | H05K 3/325 | 439/75 |
| 2009/0104823 | A1 * | 4/2009 | Ludwig | H01R 12/585 | 439/857 |
| 2011/0159743 | A1 * | 6/2011 | Johnescu | H01R 12/585 | 29/874 |
| 2012/0126646 | A1 * | 5/2012 | Nakagawa | H02K 5/225 | 310/71 |
| 2012/0252232 | A1 * | 10/2012 | Buck | H01R 43/20 | 439/55 |
| 2012/0289102 | A1 * | 11/2012 | Moll | H01R 12/585 | 439/890 |
| 2014/0302723 | A1 * | 10/2014 | Zhao | H01R 12/585 | 439/751 |
| 2016/0190718 | A1 * | 6/2016 | VanZuilen | H02K 3/522 | 310/71 |
| 2016/0190728 | A1 * | 6/2016 | VanZuilen | H01R 13/5202 | 310/71 |
| 2017/0346202 | A1 * | 11/2017 | Goto | H01R 13/2457 | |

(56) References Cited

U.S. PATENT DOCUMENTS

| | | | | |
|---|---|---|---|---|
| 2017/0358876 | A1* | 12/2017 | Smith, Jr. | H01R 12/585 |
| 2018/0205163 | A1* | 7/2018 | Sorig | H01R 13/03 |
| 2018/0287277 | A1* | 10/2018 | Lybrand | H01R 12/515 |
| 2019/0140376 | A1 | 5/2019 | Shirai et al. | |
| 2020/0021047 | A1* | 1/2020 | Kishibata | H01R 12/585 |
| 2020/0287305 | A1* | 9/2020 | Yagyu | H01R 13/03 |
| 2021/0084745 | A1* | 3/2021 | Kim | H01L 23/40 |
| 2023/0017724 | A1* | 1/2023 | Neef | H01R 12/585 |

FOREIGN PATENT DOCUMENTS

| | | | |
|---|---|---|---|
| JP | 2015-76317 | A | 4/2015 |
| JP | 2017-212198 | A | 11/2017 |
| JP | 2018-156804 | A | 10/2018 |
| JP | 2020-13641 | A | 1/2020 |
| WO | 2007/144428 | A1 | 12/2007 |

* cited by examiner

ASSEMBLY PARTS FOR CONNECTOR DEVICE AND CONNECTOR DEVICE

TECHNICAL FIELD

The present invention relates to assembly parts for connector device and a connector device.

The present application claims priority based on Japanese Patent Application No. 2020-064595 filed on Mar. 31, 2020, the entire contents of which are incorporated herein by reference.

BACKGROUND ART

Patent Document 1 discloses a press-fit terminal. The press-fit terminal includes, in order from the leading end side thereof, a tip portion that is constituted by a guide portion, and a press-fit portion that is constituted by a substrate connection portion that is to be press-fitted into a through hole of a substrate. The substrate connection portion includes contact pieces that are constituted by a pair of bulging pieces, and an eye hole that is constituted by a gap between the pair of bulging pieces.

CITATION LIST

Patent Document

Patent Document 1: JP 2018-156804A

SUMMARY OF INVENTION

Assembly parts for connector device according to the present disclosure include: a substrate having a through hole; and a press-fit terminal that is a rod shape member and that is to be press-fitted into the through hole, in which the press-fit terminal includes, in order from a leading end side of the press-fit terminal, a leading end portion, a press-fit portion, and a base end portion, the press-fit portion includes: an eye hole that penetrates through the press-fit terminal; a parallel portion that includes two contact pieces that are parallel with each other and are separated by the eye hole; and a tapered portion that connects the parallel portion and the leading end portion to each other, and in a vertical cross section of the press-fit terminal taken at positions where the press-fit terminal is widest, the eye hole is provided with a curved line that constitutes a leading end-side portion of the eye hole, lines that constitute the tapered portion each include a contact point and a reference point, the contact points are points that first come into contact with an opening edge of the through hole when the press-fit terminal is inserted into the through hole, the reference points are intersections of the lines that constitute the tapered portion and specific orthogonal lines, the specific orthogonal lines are orthogonal lines passing through end points of the curved line, of lines orthogonal to the lines that constitute the tapered portion, and the contact points are located closer to the leading end portion than the reference points are.

A connector device according to the present disclosure includes: a substrate having a through hole; and a rod-shaped press-fit terminal that is press-fitted into the through hole, in which the substrate is a substrate that is included in the assembly parts for connector device according to the present disclosure, and the press-fit terminal is a press-fit terminal that is included in the assembly parts for connector device according to the present disclosure.

DESCRIPTION OF EMBODIMENTS

Figure 1:
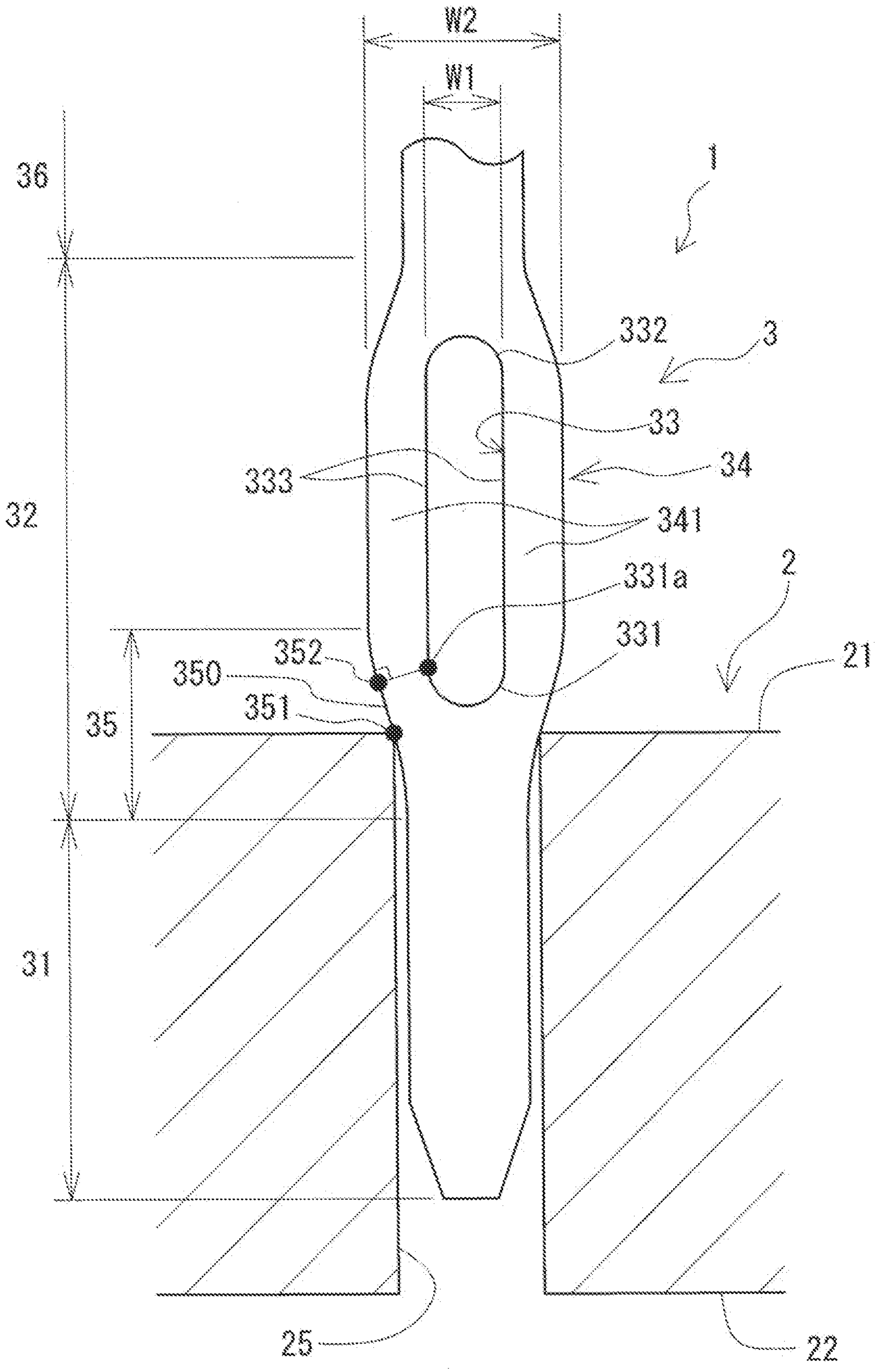
FIG. 1 is a vertical cross-sectional view showing a schematic representation of assembly parts for connector device according to a first embodiment.

Problem to be Solved by the Present Disclosure

It is desired that press-fit terminals are less likely to suffer damage such as cracks when press-fitted into a through hole of a substrate.

An objective of the present disclosure is to provide assembly parts for connector device with which the press-fit terminal thereof is less likely to be damaged when press-fitted into a through hole of a substrate.

Another objective of the present disclosure is to provide a connector device assembled using the above-described assembly parts for connector device.

Effects of the Present Disclosure

In the assembly parts for connector device according to the present disclosure, the press-fit terminal thereof is less likely to be damaged when press-fitted into a through hole of a substrate.

The connector device according to the present disclosure can be used for a long period of time.

Description of Embodiment of the Present Disclosure

Inventors of the present invention carried out a thorough investigation to determine causes of damage to a press-fit terminal such as cracks that occur when the press-fit terminal is press-fitted into a through hole of a substrate. As a result, the inventors found that one of the causes was that the contact points were located on the base end side with respect to reference points, as indicated by the test examples described below. The contact points are points at which, when the press-fit terminal is inserted into a through hole of a substrate, the press-fit terminal first comes into contact with the opening edge of the through hole. The reference points are intersections of lines that constitute a tapered portion and a specific orthogonal line in the vertical cross section of the press-fit terminal described below. The tapered portion is positioned at a leading end portion-side of the press-fit portion, and connects a parallel portion and the leading end portion to each other. The specific orthogonal line is an orthogonal line passing through the end point of the curved line that constitutes the leading end-side portion of the eye hole, of lines orthogonal to the line that constitutes the tapered portion. These reference points are points at which the maximum principal strain is the largest due to the stress generated when the press-fit portion is press-fitted into the through hole.

Possible reasons therefor are as follows. In a press-fit terminal whose reference points are located closer to the leading end than the contact points are, tensile stress is applied to the reference points from the initial stage of the press-fitting to the completion of the press-fitting. If the period for which tensile stress is applied is long, cracks are likely to occur. Therefore, a press-fit terminal whose reference points are located closer to the leading end than the contact points are is likely to be damaged when press-fitted into a through hole of a substrate.

The inventors of the present invention manufactured a press-fit terminal designed so that the contact points were located closer to the leading end than the reference points were, and press-fitted the press-fit terminal into a through hole as shown in the test examples described below, and found that the press-fit terminal was less likely to suffer damage such as cracks.

Possible reasons therefor are as follows. In the press-fit terminal whose contact points are located closer to the leading end than the reference points are, compressive stress, not tensile stress, is applied to the reference points in the initial stage of press-fitting into the through hole, unlike the press-fit terminal whose reference points are located closer to the leading end than the contact points are. The compressive stress applied to the reference points decreases as the insertion length of the press-fit portion into the through hole increases. When the aforementioned insertion length exceeds a certain length, the compressive stress applied to the reference points shifts to tensile stress. That is to say, if the aforementioned insertion length exceeds a certain length, tensile stress is applied to the reference points. The tensile stress applied to the reference points increases as the aforementioned insertion length increases. As described above, in the press-fit terminal whose contact points are located closer to the leading end than the reference points are, tensile stress is applied for a shorter period than in the press-fit terminal whose reference points are located closer to the leading end than the contact points are. Therefore, cracks are less likely to occur. That is to say, the press-fit terminal is less likely to be damaged when press-fitted into a through hole.

The present invention is based on these findings. First, aspects of the present disclosure be listed and described.

(1) Assembly parts for connector device according to an aspect of the present disclosure include: a substrate having a through hole; and a press-fit terminal that is a rod shape member and that is to be press-fitted into the through hole, in which the press-fit terminal includes, in order from a leading end side of the press-fit terminal, a leading end portion, a press-fit portion, and a base end portion, the press-fit portion includes: an eye hole that penetrates through the press-fit terminal; a parallel portion that includes two contact pieces that are parallel with each other and are separated by the eye hole; and a tapered portion that connects the parallel portion and the leading end portion to each other, and in a vertical cross section of the press-fit terminal taken at positions where the press-fit terminal is widest, the eye hole is provided with a curved line that constitutes a leading end-side portion of the eye hole, lines that constitute the tapered portion each include a contact point and a reference point, the contact points are points that first come into contact with an opening edge of the through hole when the press-fit terminal is inserted into the through hole, the reference points are intersections of the lines that constitute the tapered portion and specific orthogonal lines, the specific orthogonal lines are orthogonal lines passing through end points of the curved line, of lines orthogonal to the lines that constitute the tapered portion, and the contact points are located closer to the leading end portion than the reference points are.

With the above-described configuration, the press-fit terminal is less likely to be damaged when the press-fit portion is press-fitted into the through hole of the substrate. As described above, this is because the contact points of the press-fit terminal are located closer to the leading end than the reference points are, and the period for which tensile stress is applied to the reference points is likely to be short. Therefore, with the above-described configuration it is possible to assemble a connector device in which the substrate and the press-fit terminal are connected to each other, without causing damage to the press-fit terminal when the press-fit terminal is press-fitted into the through hole.

(2) According to an embodiment of the above-described assembly parts for connector device, a width of the eye hole may be at least 0.1 times an outer width of the parallel portion.

When the width of the eye hole is 0.1 times the outer width of the parallel portion or larger, the width of the eye hole is relatively large. That is to say, the width of each of the two contact pieces included in the parallel portion is relatively small. Therefore, with the above-described configuration, each of the two contact pieces easily deforms when the press-fit portion is press-fitted into the through hole. Therefore, with the above-described configuration, the press-fit portion is easily press-fitted into the through hole.

(3) According to an embodiment of the above-described assembly parts for connector device, a thickness of the press-fit terminal may be at least 0.2 mm and at most 0.8 mm.

With the above-described configuration, the thickness of the press-fit terminal is 0.8 mm or smaller, and the thickness of the press-fit terminal is thin. Therefore, the connector can be downsized even if the connector is a multi-pole connector. With the above-described configuration, the connector can be downsized, and the conductive path of the connector can be secured in a small space. With the above-described configuration, the thickness of the press-fit terminal is 0.2 mm or larger, and the thickness of the press-fit terminal is not excessively thin. Therefore, the strength of the press-fit terminal is relatively high.

(4) According to an embodiment of the above-described assembly parts for connector device, a number of the press-fit terminal is eight or more.

With the above-described configuration, even if the number of press-fit terminals is eight or more, the connector in which the press-fit terminals are provided can be downsized because each press-fit terminal is relatively small. With the above-described configuration, the connector can be downsized, and the conductive path of the connector can be secured in a small space.

(5) According to an embodiment of the above-described assembly parts for connector device, the press-fit terminal and the substrate may constitute a control module.

With the above-described configuration, the press-fit terminal is less likely to be damaged when press-fitted into the through hole of the substrate. Therefore, the press-fit terminal and the substrate are suitable for constituting a control module.

(6) A connector device according to an aspect of the present disclosure includes: a substrate having a through hole; and a press-fit terminal that is a rod shape member and that is press-fitted into the through hole. The substrate is a substrate that is included in the assembly parts for connector device according to any one of (1) to (5) described above, and the press-fit terminal is a press-fit terminal that is included in the assembly parts for connector device according to any one of (1) to (5) described above.

The above-described configuration can be used for a long period of time. Possible reasons therefor are as follows. With the above-described configuration, the press-fit terminal that is less likely to be damaged when press-fitted into the through hole of the substrate is press-fitted into the through hole. That is to say, the press-fit terminal press-fitted into the through hole is not damaged. Therefore, there is substantially no possibility that damage to the press-fit terminal will increase during the use of the connector device.

Details of Embodiments of the Present Disclosure

Details of embodiments of the present disclosure will be described below. The same reference numerals in the drawings indicate components with the same name.

First Embodiment

Assembly Parts for Connector Device

Assembly parts for connector device 1 according to a first embodiment will be described with reference to FIGS. 1 and 2. The assembly parts for connector device 1 according to the present embodiment include a substrate 2 and a press-fit terminal 3. The substrate 2 includes a through hole 25. The press-fit terminal 3 is a rod-shaped member that is to be press-fitted into the through hole 25. The press-fit terminal 3 includes, in order from the leading end side thereof, a leading end portion 31, a press-fit portion 32, and a base end portion 36. The press-fit portion 32 includes an eye hole 33, a parallel portion 34, and a tapered portion 35. The eye hole 33 penetrates through the press-fit terminal 3. The parallel portion 34 includes two contact pieces 341 that are parallel with each other and are separated by the eye hole 33. The contact pieces 341 come into contact with the inner circumferential surface of the through hole 25 when inserted into the through hole 25. The tapered portion 35 connects the parallel portion 34 and the leading end portion 31 to each other. A feature of the assembly parts for connector device 1 according to the present embodiment lies in that, in a vertical cross-section of the press-fit terminal 3, the lines that constitute the tapered portion 35 each include a contact point 351 and a reference point 352 that satisfy a specific positional relationship. The following describes each component in detail.

In the following description, the leading end side of the press-fit terminal 3 is positioned on the substrate 2-side when the assembly parts for connector device 1 is to be assembled. The leading end side of the press-fit terminal 3 coincides with the bottom side of the sheet of FIG. 1. The axial direction of the eye hole 33 coincides with the thickness direction of the press-fit terminal 3. The axial direction of the eye hole 33 and the thickness direction of the press-fit terminal 3 coincide with the vertical direction on the sheet of FIG. 1 and the top-bottom direction on the sheet of FIG. 2. The direction in which the two contact pieces 341 of the press-fit terminal 3 are parallel with each other coincides with the width direction of the press-fit terminal 3. The direction in which the two contact pieces 341 are parallel with each other and the width direction of the press-fit terminal 3 coincide with the left-right direction on the sheets of FIGS. 1 and 2. The vertical cross section of the press-fit terminal 3 is a cross section taken at positions where the press-fit terminal 3 is widest. The positions where the tapered portion 35 is widest come into contact with the opening edge of the through hole 25. Therefore, the cross section is taken at positions where the press-fit terminal 3 is widest. In the present embodiment, the positions where the press-fit terminal 3 is widest are located on the single-dotted line indicated by I-I in FIG. 2, at which the thickness of the press-fit terminal 3 is bisected. Although the press-fit terminal 3 is shown with the above-described vertical cross section in FIG. 1, the vertical cross section is not hatched for convenience of explanation. A direction orthogonal to both the thickness direction and the width direction of the press-fit terminal 3, i.e., a direction in which the leading end portion 31, the press-fit portion 32, and the base end portion 36 are arranged in series, is the lengthwise direction of the press-fit terminal 3. The lengthwise direction of the press-fit terminal 3 coincides with the vertical direction on the sheet of FIG. 1.

Substrate

Electronic components such as a semiconductor relay and a connector are mounted on the substrate 2. The members mounted on the substrate 2 such as an electronic part and a connector are omitted from the figure. A printed circuit board can be used as the substrate 2.

The substrate 2 includes the through hole 25. The through hole 25 includes a penetrating hole that is open in a front surface 21 and a back surface 22 of the substrate 2, and a conductor layer that is provided on the inner circumferential surface of the penetrating hole. The conductor layer is made of metal. The metal may be copper, for example. The conductor layer is electrically connected to conductor patterns on the front surface 21 and the back surface 22 of the substrate 2, for example. The leading end-side portion of the press-fit terminal 3 described below, specifically, the press-fit portion 32, is to be press-fitted into the through hole 25. The conductor layer of the through hole 25 and the press-fit portion 32 are electrically connected to each other by being brought into contact with each other.

The inner circumferential surface of the through hole 25 has a tubular shape that is uniform in the axial direction of the through hole 25. The opening of the through hole 25 may have a circular shape, an elliptical shape, a race track shape, or an angular shape, for example. The angular shape may be a rectangular shape, for example.

The inside dimension of the through hole 25 can be selected as appropriate. When the opening of the through hole 25 has a circular shape, the inside dimension is the inner diameter thereof. When the opening of the through hole 25 has an elliptical shape, the inside dimension is the length of the minor axis thereof. When the opening of the through hole 25 has a race track shape, the inside dimension is the length between the straight sides thereof that face each other. When the opening of the through hole 25 has a rectangular shape, the inside dimension is the length of the short side thereof.

The length of the through hole 25 in the axial direction thereof can be selected as appropriate. The length of the through hole 25 in the axial direction thereof may be, for example, a length with which the entire length of the press-fit portion 32 of the press-fit terminal 3 described below can be housed in the through hole 25.

Press-Fit Terminal

The press-fit terminal 3 is a rod-shaped member that electrically connects the substrate 2 and a counterpart connector to each other. The counterpart connector is omitted from the figure.

The material of the press-fit terminal 3 may be, for example, copper, a copper alloy, or the like. A coating layer that is made of metal may be provided on the surface of the press-fit terminal 3. The material of the coating layer may be, for example, tin, a tin alloy, or the like. The press-fit terminal 3 is obtained by stamping a metal plate. The press-fit terminal 3 provided with a coating layer can be obtained by providing a coating layer after performing stamping.

The front surface and the back surface of the press-fit terminal 3 are each constituted by a flat surface in the present embodiment. The front surface is a surface located on one side of the press fit terminal 3 in the thickness direction thereof and the back surface is a surface located on the opposite side thereof. The front surface is a surface located on the front side of the sheet of FIG. 1 and the back surface is a surface located on the back side of the sheet of FIG. 1.

Figure 2:
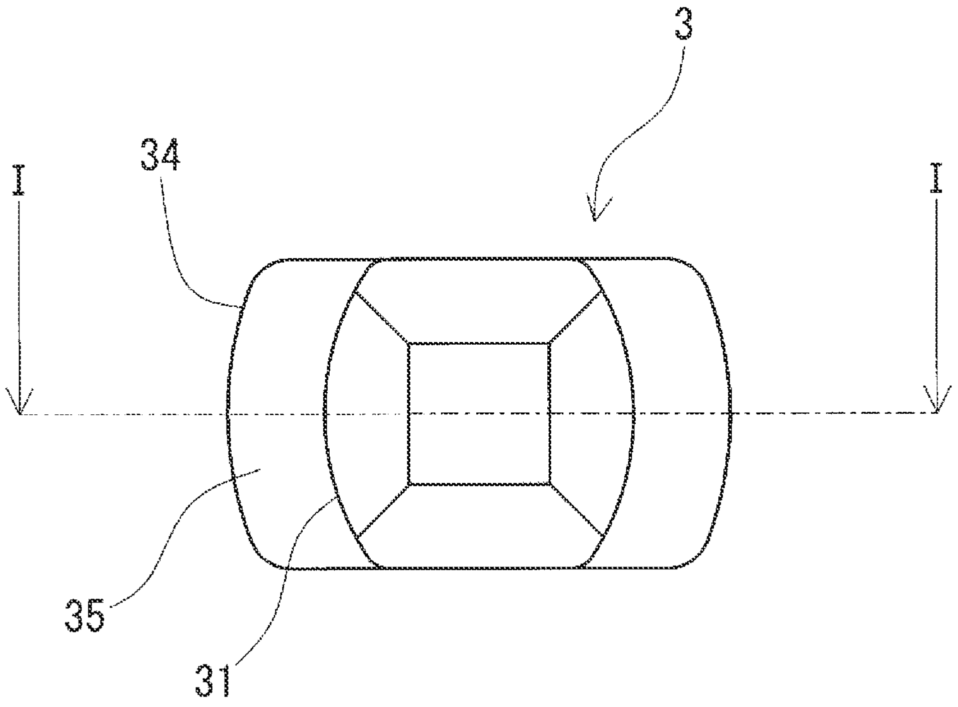
FIG. 2 is a diagram showing a press-fit terminal included in the assembly parts for connector device according to the first embodiment, seen from the leading end side of the press-fit terminal.

As shown in FIG. 2, two side surfaces of the press-fit terminal 3 are each constituted by a curved surface that protrudes outward in the width direction of the press-fit terminal 3. These two side surfaces are a surface located on one side of the press fit terminal 3 in the thickness direction thereof and a surface located on the opposite side thereof, respectively. These two side surfaces are the surface located on the left side on the sheets of FIGS. 1 and 2, and the surface located on the right side on the sheets of FIGS. 1 and 2, respectively. FIG. 1 shows a state in which the press-fit terminal 3 is cut along the single-dotted line indicated by I-I in FIG. 2.

The press-fit terminal 3 includes, in order from the leading end side thereof, the leading end portion 31, the press-fit portion 32, and the base end portion 36.

Leading End Portion

The leading end portion 31 is a portion that is to be initially inserted into the through hole 25. The width and the thickness of the leading end portion 31 are smaller than the inside dimension of the through hole 25. In the above-described vertical cross section, the leading end portion 31 includes a portion with a width that is uniform in the lengthwise direction of the press-fit terminal 3, and a portion that tapers toward the leading end.

Press-Fit Portion

The press-fit portion 32 is a portion that is to be press-fitted into the through hole 25. When the press-fit portion 32 is press-fitted into the through hole 25, the press-fit portion 32 presses against the inner circumferential surface of the through hole 25. As a result of such pressing, the press-fit portion 32 is unlikely to come loose from the through hole 25. Therefore, the press-fit terminal 3 and the substrate 2 can be connected to each other without using a metal connection material such as a solder. The press-fit portion 32 includes the eye hole 33, the parallel portion 34, and the tapered portion 35.

Eye Hole

When the press-fit portion 32 is to be press-fitted into the through hole 25 of the substrate 2, the eye hole 33 makes it easier for the press-fit portion 32 to be press-fitted, by enabling the two contact pieces 341 included in the parallel portion 34 described below to deform, and makes it easier for the two contact pieces 341 to press against the inner circumferential surface of the through hole 25 when the press-fit portion 32 is press-fitted into the through hole 25. The eye hole 33 penetrates through the press-fit terminal 3.

The inner circumferential surface of the eye hole 33 has a tubular shape that is uniform in the axial direction of the eye hole 33. In the vertical cross section of the press-fit terminal 3, the opening of the eye hole 33 is an elongated hole that extends from the leading end side to the base end side thereof. The above-described opening shape of the eye hole 33 may be an elliptical shape, a race track shape, or the like.

In the above-described vertical cross section, the eye hole 33 is provided with a first curved line 331 that constitutes a leading end-side thereof, a second curved line 332 that constitutes a base end portion 36-side thereof, and two intermediate lines 333 that connect the first curved line 331 and the second curved line 332.

In the present embodiment, the first curved line 331 is constituted by one arc line that protrudes toward the leading end side. Note that the first curved line 331 may be constituted by a combination of a plurality of arcs unlike in the present embodiment. The first curved line 331 has two end points 331*a*. The end points 331*a* of the first curved line 331 are the end points closest to the leading end in the first curve 331. In the present embodiment in which the first curved line 331 is constituted by one arc line, the end points 331*a* of the first curved line 331 are the termination points of the arc line. Unlike in the present embodiment, if the first curved line 331 is composed of a combination of a plurality of arcs, and includes, for example, a first arc line and a second arc line in order from the leading end side, the end points of the first curved line 331 are at the boundary between the first arc line and the second arc line.

In the present embodiment, the second curved line 332 is constituted by one arc line that protrudes toward the base end side. Note that the second curved line 332 may be constituted by a combination of a plurality of arcs unlike in the present embodiment. The second curved line 332 has two end points. As with the end points of the first curved line 331, the end points of the second curved line 332 are the end points closest to the base end in the second curved line 332.

In the present embodiment, the two intermediate lines 333 are straight lines that extend in the lengthwise direction of the press-fit terminal 3 in parallel with each other. Note that the two intermediate lines 333 may be formed by connecting a plurality of straight lines, which include straight lines that are not parallel with each other. When the two intermediate lines 333 are formed by connecting a plurality of straight lines, each of the two intermediate lines 333 may be constituted by, for example, a first inclined line on the first curved line 331 side, a second inclined line on the second curved line 332 side, and a straight line that connects the first inclined line and the second inclined line to each other. That is to say, the two intermediate lines 333 are constituted by two first inclined lines, two second inclined lines, and two straight lines. Each first inclined line extends outward in the width direction of the press-fit terminal 3, in a direction from the end points 331*a* of the first curved line 331 to the second curved line 332. Each second inclined line extends outward in the width direction of the press-fit terminal 3, in a direction from the end points of the second curved line 332 to the first curved line 331. Each straight line may be constituted by a straight line that extends in the lengthwise direction of the press-fit terminal 3.

The width W1 of the eye hole 33 may be, for example, at least 0.1 times an outer width W2 of the parallel portion 34 described below. The width W1 of the eye hole 33 and the outer width W2 of the parallel portion 34 are each the maximum width in the above-described vertical cross section. When the width W1 of the eye hole 33 is 0.1 times the outer width W2 or larger, the width W1 of the eye hole 33 is relatively large. That is to say, the width of each of the two contact pieces 341 described below is relatively small. Therefore, each of the two contact pieces 341 is likely to deform when the press-fit portion 32 is press-fitted into the through hole 25. In another example, the width W1 of the eye hole 33 may be 0.2 times the outer width W2 or larger, and 0.25 times the outer width W2 or larger in a specific example.

The width W1 of the eye hole 33 may be, for example, at most 0.6 times the outer width W2. When the width W1 of the eye hole 33 is 0.6 times the outer width W2 or smaller, the width W1 of the eye hole 33 is not excessively large. Therefore, the load applied to the press-fit portion 32 when the press-fit portion 32 is press-fitted into the through hole 25 is reduced. In another example, the width W1 of the eye hole 33 may be 0.5 times the outer width W2 or smaller, and 0.45 times the outer width W2 or smaller in a specific example.

That is to say, the width W1 of the eye hole 33 may be, at least 0.1 times and at most 0.6 times of the outer width W2, and at least 0.2 times and at most 0.5 times the outer width W2 in another example, and at least 0.25 times and at most 0.45 times the outer width W2 in a specific example.

Parallel Portion

In the parallel portion 34, the eye hole 33 and the two contact pieces 341 are arranged in parallel with each other. In the press-fit portion 32, the parallel portion 34 includes a portion whose outer width W2 is larger than the inside dimension of the through hole 25. The parallel portion 34 includes the two contact pieces 341 that are parallel with each other and are separated by the eye hole 33. The outer width W2 of the parallel portion 34 is the length between the outer sides of the two contact pieces 341 in the width direction of the press-fit terminal 3. The two contact pieces 341 deform when the press-fit portion 32 is press-fitted into the through hole 25. As a result of such deformation, the press-fit portion 32 is inserted into the through hole 25. In the through hole 25, the two contact pieces 341 press against the inner circumferential surface of the through hole 25. As a result of such pressing, the press-fit portion 32 is restricted from coming loose from the through hole 25. There is no need to use a metal connection material such as a solder to connect the press-fit terminal 3 and the substrate 2 to each other. The two contact pieces 341 extend straight in the lengthwise direction of the press-fit terminal 3.

Tapered Portion

The tapered portion 35 connects the parallel portion 34 and the leading end portion 31 to each other. The width of the tapered portion 35 in this example decreases in a direction from the parallel portion 34 to the leading end portion 31 in the above-described vertical cross section. Hereinafter, the lines that constitute the tapered portion 35 in the above-described vertical cross section are each referred to as a tapered line 350. Each tapered line 350 has a contact point 351 and a reference point 352. FIG. 1 shows, in the tapered portion 35, the contact point 351 and the reference point 352 on the tapered line 350 on the left side of the sheet of drawing. The contact point and the reference point on the tapered line on the right side of the sheet of the drawing are omitted for convenience of explanation. The contact point and the reference point on the right side of the sheet of the drawing and the contact point and the reference point on the left side of the sheet of the drawing are located so as to be line-symmetrical with respect to the center line of the press-fit terminal 3 in the lengthwise direction thereof. One side in the width direction coincides with the left side of the sheet of FIG. 1, and the other side in the width direction coincides with the right side of the sheet of FIG. 1. The tapered line 350 may be a straight line or a curved line.

Contact Point and Reference Point

The contact point 351 is a point that is to first come into contact with the opening edge of the through hole 25 when the press-fit terminal 3 is inserted into the through hole 25 of the substrate 2. That is to say, the contact point 351 is located at a position where the tapered portion 35 has the same width as the inside dimension of the through hole 25. The contact point 351 is located closer to the leading end than the reference point 352 on the tapered line 350 is.

The reference point 352 is an intersection between the tapered line 350 and the specific orthogonal line. The specific orthogonal line is an orthogonal line passing through the end point 331*a* of the first curved line 331 on the leading end side of the eye hole 33, of lines orthogonal to the tapered line 350. If the tapered line 350 is a straight line, the lines orthogonal to the tapered line 350 are lines orthogonal to the tapered line 350 itself, and if the tapered line 350 is a curved line, the lines orthogonal to the tapered line 350 are lines orthogonal to a line tangent to the tapered line 350. This reference point 352 is a point where the maximum principal strain is the largest due to the stress applied when the press-fit portion 32 is press-fitted into the through hole 25. The reference point 352 is located closer to the base end than the contact point 351 on the tapered line 350 is. That is to say, the reference point 352 is located at a position where the tapered portion 35 has a larger width than the width where the contact point 351 is provided.

The contact point 351 and the reference point 352 of the press-fit terminal 3 according to the present embodiment satisfy the above-described positional relationship, and therefore, in the initial stage of the press-fitting of the press-fit portion 32 into the through hole 25, compressive stress is applied to the reference point 352. The compressive stress applied to the reference point 352 decreases as the insertion length of the press-fit portion 32 into the through hole 25 increases. When the aforementioned insertion length exceeds a certain length, the compressive stress applied to the reference point 352 shifts to tensile stress. That is to say, when the aforementioned insertion length exceeds a certain length, tensile stress is applied to the reference point 352. The tensile stress applied to the reference point 352 increases as the aforementioned insertion length increases.

Figure 4:
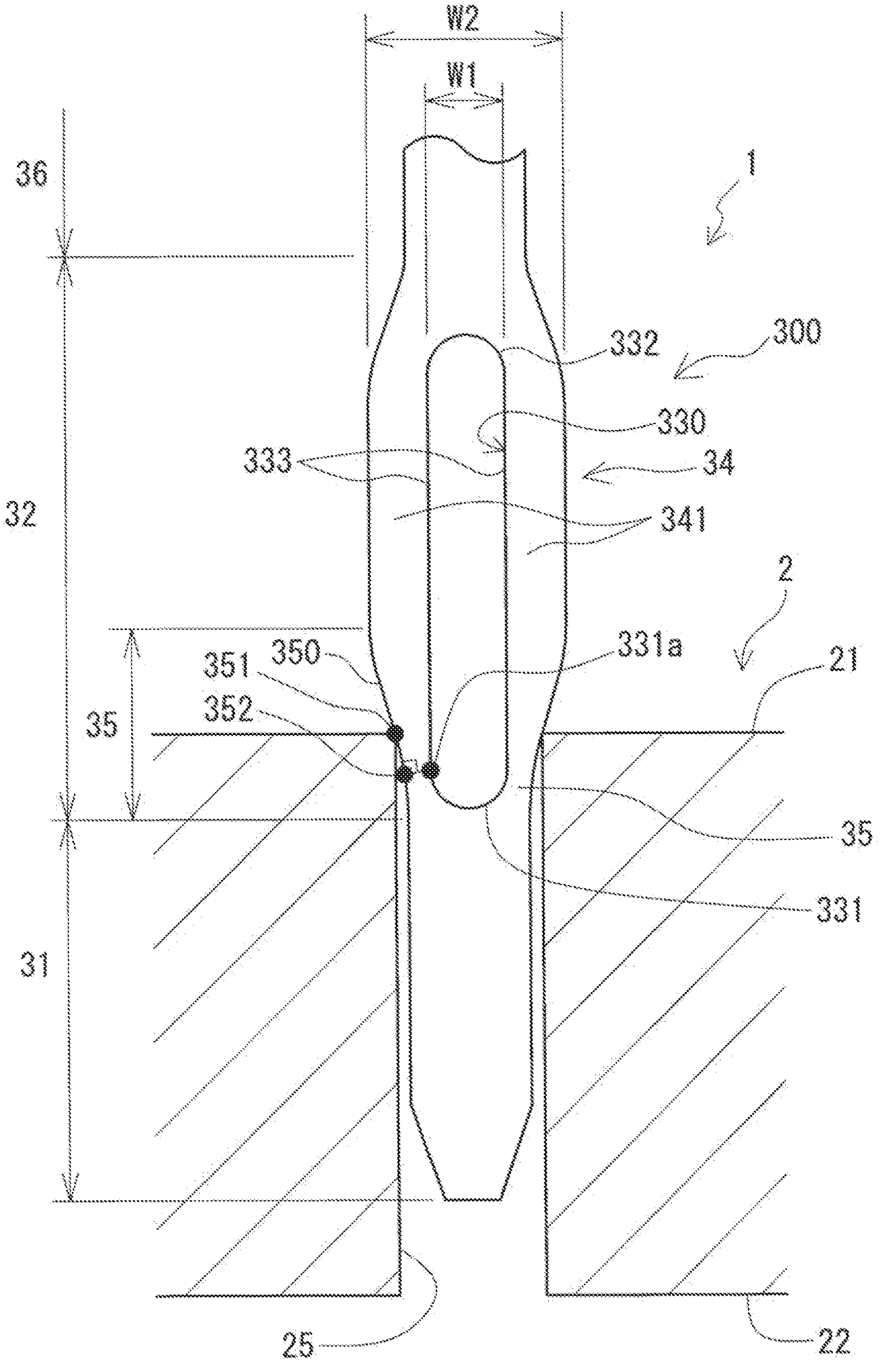
FIG. 4 is a vertical cross-sectional view showing a schematic representation of conventional assembly parts for connector device.

A conventional press-fit terminal 300 will be described with reference to FIG. 4. The conventional press-fit terminal 300 shown in FIG. 4 is substantially the same as the press-fit terminal 3 according to the present embodiment except the following configurations (a) and (b) illustrated below. Although a vertical cross section is shown for the press-fit terminal 300 in FIG. 4, the vertical cross section is not hatched for convenience of explanation. In the configuration (a), the length of an eye hole 330 in the lengthwise direction of the press-fit terminal 300 is greater than the length of the eye hole 33 in the press-fit terminal 3 of the present embodiment in the lengthwise direction of the press-fit terminal 3. In the configuration (b), the positional relationship between the contact point 351 and the reference point 352 is inverted, and the reference point 352 is located closer to the leading end than the contact point 351 is. In the conventional press-fit terminal 300, tensile stress is applied to the reference point 352 from the initial stage of the press-fitting to the completion of the press-fitting. That is to say, in the press-fit terminal 300, compressive stress is not applied to the reference point 352 unlike in the press-fit terminal 3 according to the present embodiment. The tensile stress applied to the reference point 352 increases as the aforementioned insertion length increases.

In this way, in the press-fit terminal 3 according to the present embodiment, the period for which tensile stress is applied is shorter than in the conventional press-fit terminal 300. In the conventional press-fit terminal 300, the period for which tensile stress is applied is long, and it is highly likely that cracks will occur. In contrast, in the press-fit terminal 3 according to the present embodiment, the period for which tensile stress is applied is short, and therefore cracks are less likely to occur. Therefore, the press-fit terminal 3 according to the present embodiment is less likely to be damaged when press-fitted into the through hole 25.

Base End Portion

The base end portion 36 extends to the side opposite to the leading end portion 31 with respect to the press-fit portion 32. The base end portion 36 includes a connection portion that is to be electrically connected to the counterpart connector. The counterpart connector is to be inserted into a connector housing. The connector housing is omitted from the figures. The connector housing has a tubular shape. The connector housing includes an opening through which the counterpart connector is inserted into the connector housing, and the bottom wall provided opposite to the opening. The connection portion of the base end portion 36 penetrates through the bottom wall of the connector housing, and is positioned in the connector housing. The connection portion of the base end portion 36 is to be electrically connected to the counterpart connector in the housing.

Thickness

The thickness of the press-fit terminal 3 can be selected as appropriate according to the application of the assembly parts for connector device 1, The thickness of the press-fit terminal 3 may be, for example, at least 0.2 mm and at most 0.8 mm. When the thickness of the press-fit terminal 3 is 0.8 mm or smaller, the thickness of the press-fit terminal 3 is thin, and the connector can be downsized even if the connector is a multi-pole connector. When the thickness of the press-fit terminal 3 is 0.2 mm or larger, the thickness of the press-fit terminal 3 is not excessively thin, and therefore the strength of the press-fit terminal 3 is relatively high. In another example, the thickness of the press-fit terminal 3 may be at least 0.4 mm and at most 0.6 mm, and at least 0.4 mm and at most 0.5 mm in a specific example. In particular, the thickness of the press-fit terminal 3 is preferably 0.4 mm.

Number

The number of press-fit terminals 3 can be selected as appropriate according to the application of the assembly parts for connector device 1. The number of press-fit terminals 3 may be, for example, eight or more. The thickness of the press-fit terminals 3 is small and the press-fit terminals 3 are small-sized. Therefore, even if the number of press-fit terminals 3 is eight or more, the connector in which the press-fit terminals 3 are provided can be downsized. In addition, the conductive path of the connector can be secured in a small space. In another example, the number of press-fit terminals 3 may be 20 or more, and may be 50 or more in a specific example. The number of press-fit terminals 3 may be 100 or more.

Applications

Figure 5:
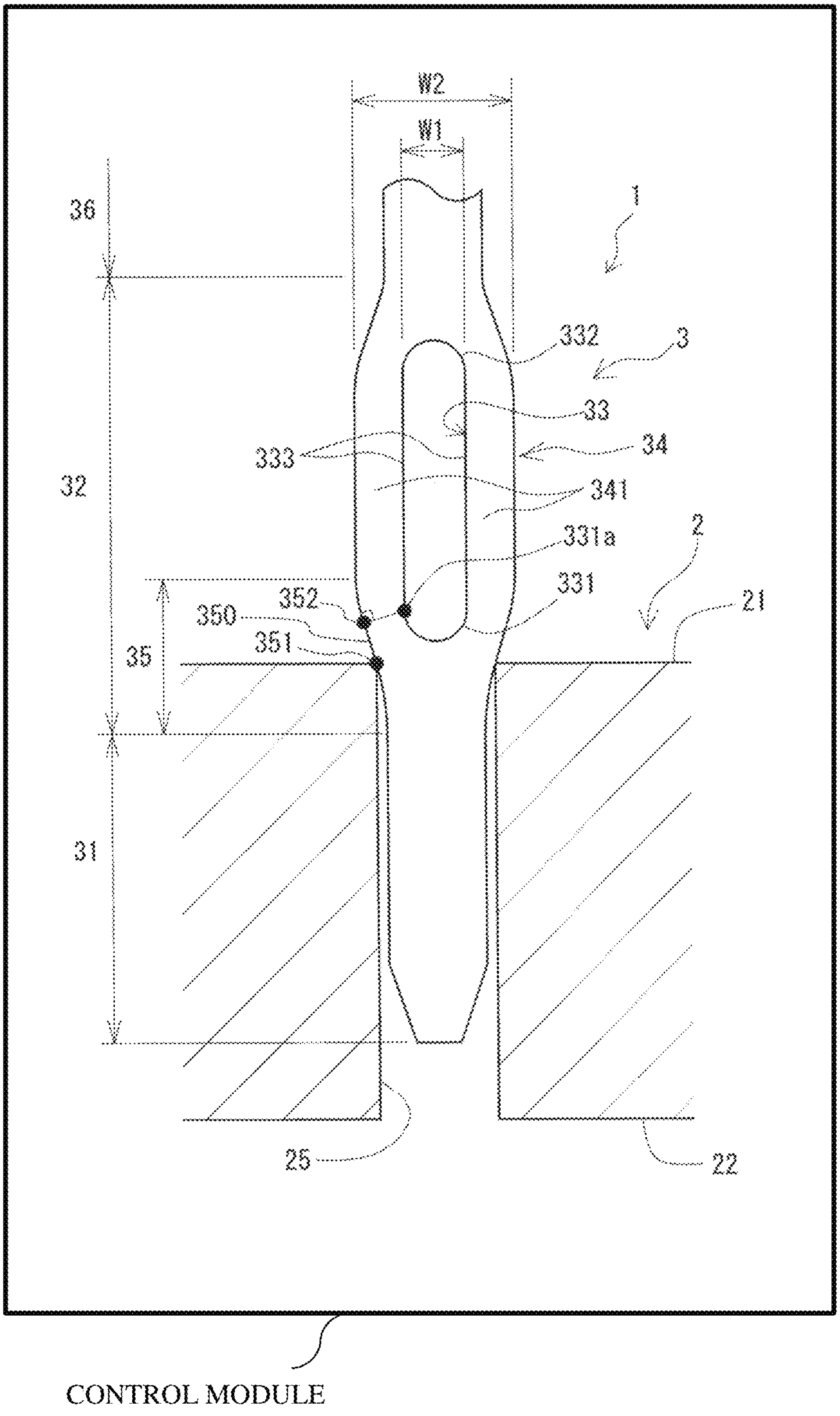
FIG. 5 shows a schematic representation of a control module including a connector device.

The assembly parts for connector device 1 according to the present embodiment can be used to assemble a control module, as shown in FIG. 5. The control module may be, for example, an automobile body control module, an airbag control module, or the like.

Actions and Effects

In the assembly parts for connector device 1 according to the present embodiment, the press-fit terminal 3 is less likely to be damaged when the press-fit portion 32 is press-fitted into the through hole 25 of the substrate 2. This is because the contact point 351 of the press-fit terminal 3 is located closer to the leading end than the reference point 352 is, and the period for which tensile stress is applied to the reference point 352 is likely to be short. Therefore, the assembly parts for connector device 1 can be used to assemble a connector device in which the substrate 2 and the press-fit terminal 3 are connected to each other, without causing damage to the press-fit terminal 3 when the press-fit terminal 3 is press-fitted into the through hole 25.

Second Embodiment

Connector Device

Figure 3:
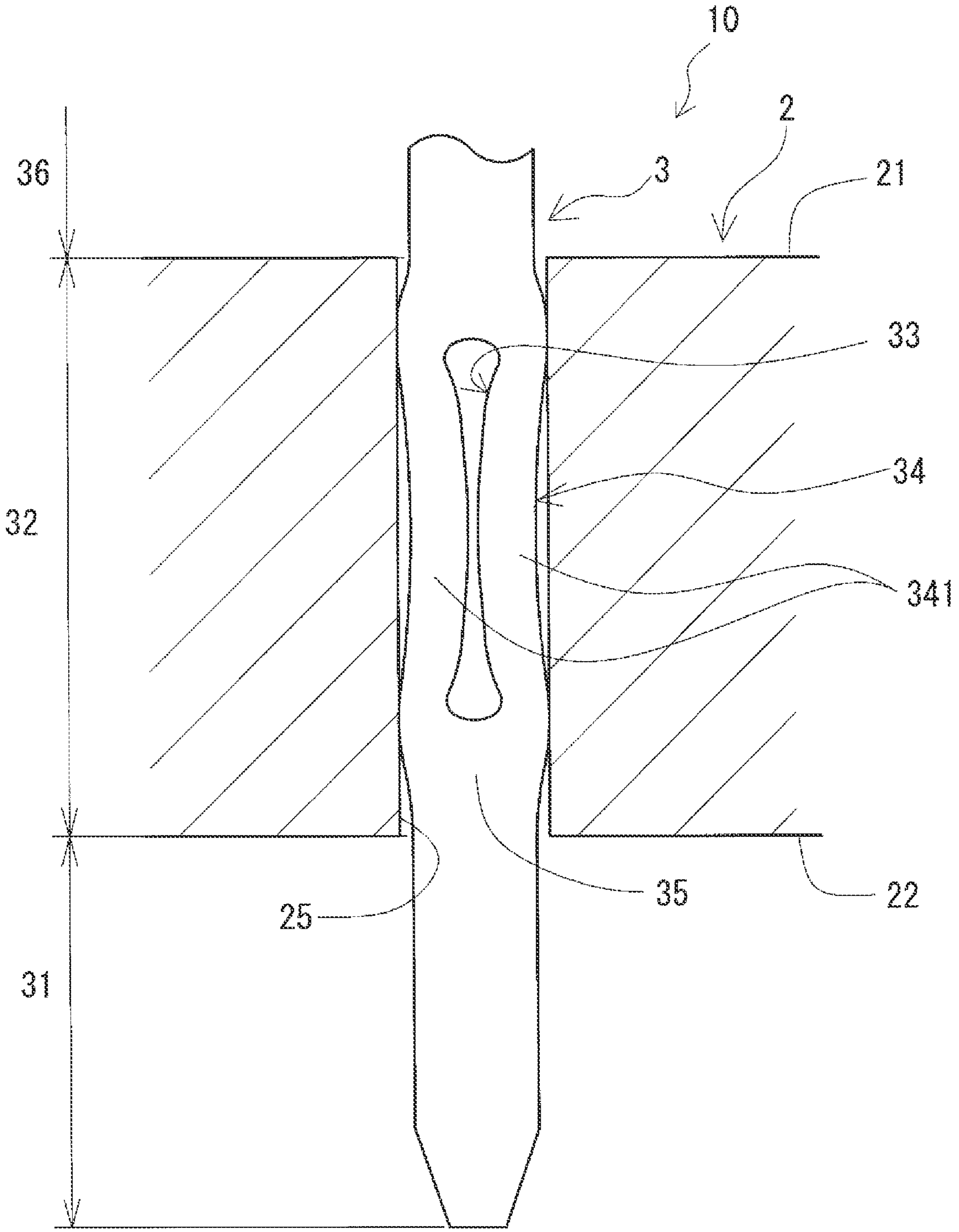
FIG. 3 is a vertical cross-sectional view showing a schematic representation of a connector device according to a second embodiment.

A connector device 10 according to a second embodiment will be described with reference to FIG. 3. The connector device 10 according to the present embodiment includes the substrate 2 having the through hole 25, and the rod-shaped press-fit terminal 3 press-fitted into the through hole 25. The connector device 10 according to the present embodiment is assembled from the assembly parts for connector device 1 according to the first embodiment. The substrate 2 is the substrate 2 included in the assembly parts for connector device 1 according to the first embodiment. The press-fit terminal 3 is the press-fit terminal 3 included in the assembly parts for connector device 1 according to the first embodiment. The press-fit portion 32 of the press-fit terminal 3 is press-fitted into the through hole 25. The two contact pieces 341 included in the parallel portion 34 of the press-fit portion 32 press the inner circumferential surface of the through hole 25 at two end portions of each contact piece 341 in the lengthwise direction thereof. The two contact pieces 341 are deformed in a direction so that the respective central portions of the contact pieces 341 in the lengthwise direction thereof approach each other.

Actions and Effects

The connector device 10 according to the present embodiment can be used for a long period of time. Possible reasons therefor are as follows. In the connector device 10, the press-fit terminal 3 that is less likely to be damaged when press-fitted into the through hole 25 of the substrate 2 is press-fitted into the through hole 25. That is to say, the press-fit terminal 3 press-fitted into the through hole 25 is not damaged. Therefore, there is substantially no possibility that damage to the press-fit terminal 3 will increase during the use of the connector device 10.

Test Example

In the present test example, the presence or absence of damage to the press-fit terminal was evaluated when the press-fit terminal was fitted into the through hole of the substrate. This evaluation was performed through experiments and CAE (Computer Aided Engineering) analyses.

Sample No. 1

The press-fit terminal of Sample No. 1 is the same as the press-fit terminal 3 included in the assembly parts for connector device 1 according to the first embodiment described with reference to FIG. 1. That is to say, in the press-fit terminal according to Sample No. 1, as shown in FIG. 1, the tapered line 350 constituting the tapered portion 35 has the contact point 351 and the reference point 352 in the vertical cross section of the press-fit terminal 3. The contact point 351 of the press-fit terminal of Sample No. 1 is located closer to the leading end than the reference point 352 is.

Sample No. 101

The press-fit terminal of Sample No. 101 is the same as the conventional press-fit terminal 300 described with reference to FIG. 4. That is to say, as described above with reference to FIG. 4, the press-fit terminal of Sample No. 101 is the same as the press-fit terminal of Sample No. 1 mainly except that the eye hole 330 is longer and the contact point 351 is located closer to the base end than the reference point 352 is.

Experiments and CAE Analyses

An experiment was conducted in which actual press-fit terminals were each inserted into the through hole of the substrate, and the presence or absence of damage to the press-fit terminal of each sample was investigated. Also, the press-fit portion of the press-fit terminal of each sample was press-fitted into the through hole of the substrate through CAE to search for the position where the maximum principal strain of the press-fit terminal of each sample was the largest, and the magnitude of the maximum principal strain and the stress generated at the reference point were calculated.

The press-fit terminal of Sample No. 1 did not suffer damage such as cracks. In contrast, in the press-fit terminal of Sample No. 101, a crack occurred near the reference point.

In both the press-fit terminals of Sample No. 1 and Sample No. 101, the position where the maximum principal strain was the largest was near the reference point. The magnitude of the maximum principal strain in the press-fit terminal of Sample No. 1 was approximately 20% larger than the magnitude of the maximum principal strain in the press-fit terminal of Sample No. 101.

Compressive stress was applied to the reference point of the press-fit terminal of Sample No. 1 in the initial stage of the press-fitting. This compressive stress applied to the reference point decreased as the insertion length of the press-fit portion into the through hole increased. When the aforementioned insertion length exceeded a certain length, the compressive stress applied to the reference point shifted to tensile stress. This tensile stress increased as the aforementioned insertion length increased.

On the other hand, tensile stress was applied to the reference point of the press-fit terminal of Sample No. 101 from the initial stage of the press-fitting to the completion of the press-fitting. That is to say, in the press-fit terminal of Sample No. 101, compressive stress was substantially not applied to the reference point, unlike in the press-fit terminal of Sample No. 1. Tensile stress increased as the aforementioned insertion length increased.

From the above results, it was found that the press-fit terminal of Sample No. 1 was able to prevent the occurrence of damage even though the maximum principal strain in the press-fit terminal of Sample No. 1 was larger than in the press-fit terminal of Sample No. 101. It can be believed that the reason for this is that, in the press-fit terminal of Sample No. 1, the contact point is located closer to the leading end than the reference point is, and therefore the period for which tensile stress was applied to the reference point could be shorter than in the press-fit terminal of Sample No. 101 in which the contact point was located closer to the base end than the reference point was.

The present invention is defined by the terms of the claims, but not limited to the above description, and is intended to include any modifications within the meaning and scope equivalent to the terms of the claims.

LIST OF REFERENCE NUMERALS

1 Assembly Parts For Connector Device
10 Connector Device
2 Substrate
21 Front Surface
22 Back Surface
25 Through Hole
3, 300 Press-fit Terminal
31 Leading End Portion
32 Press-fit Portion
33, 330 Eye Hole
331 First Curved Line
331*a* End Point
332 Second Curved Line
333 Intermediate Line
34 Parallel Portion
341 Contact Piece
35 Tapered Portion
350 Tapered Line
351 Contact Point
352 Reference Point
36 Base End Portion
W1 Width of Eye Hole
W2 Outer Width

The invention claimed is:

1. Assembly parts for a connector device comprising:
a substrate having a through hole;
a press-fit terminal that is a rod shape member and that is to be press-fitted into the through hole,
wherein the press-fit terminal includes, in order from a leading end side of the press-fit terminal, a leading end portion, a press-fit portion, and a base end portion,
the press-fit portion includes:
an eye hole that penetrates through the press-fit terminal in a thickness direction of the press-fit terminal;
a parallel portion that includes two contact pieces that are parallel with each other and are separated by the eye hole; and
a tapered portion that connects the parallel portion and the leading end portion to each other, and
a thickness of the press-fit terminal is at least 0.4 mm and at most 0.5 mm,
in a vertical cross section of the press-fit terminal taken at positions where the thickness of the press-fit terminal is bisected,
the eye hole is provided with a curved line that constitutes a leading end-side portion of the eye hole,
lines that constitute the tapered portion each include a contact point and a reference point,
the contact points are located closer to the leading end portion than the reference points are,
the contact points are points that first come into contact with an opening edge of the through hole when the press-fit terminal is inserted into the through hole,
the reference points are intersections of (i) the lines that constitute the tapered portion and (ii) lines that are orthogonal to the lines that constitute the tapered portion and pass through end points of the curved line.

2. The assembly parts for connector device according to claim 1, wherein a width of the eye hole is at least 0.1 times an outer width of the parallel portion.

3. The assembly parts for connector device according to claim 1, wherein a number of the press-fit terminal is eight or more.

4. A control module comprising the assembly parts for a connector device according to claim 1.

5. A connector device comprising:

a substrate having a through hole; and a press-fit terminal that is a rod shape member and that is press-fitted into the through hole, wherein the substrate is a substrate that is included in the assembly parts for a connector device according to claim 1, and the press-fit terminal is a press-fit terminal that is included in the assembly parts for a connector device according to claim 1.

* * * * *